US012662108B2

(12) United States Patent
Hulten et al.

(10) Patent No.: US 12,662,108 B2
(45) Date of Patent: Jun. 23, 2026

(54) SYSTEM AND METHOD FOR VEHICLE MOTION CONTROL

(71) Applicant: SENTIENT AB, Gothenburg (SE)

(72) Inventors: Johan Hulten, Gothenburg (SE); Lars Markström, Vastra Frolunda (SE); Erik Torstensson, Boras (SE)

(73) Assignee: SENTIENT AB, Gothenburg (SE)

( * ) Notice: Subject to any disclaimer, the term of this patent is extended or adjusted under 35 U.S.C. 154(b) by 0 days.

(21) Appl. No.: 18/862,568

(22) PCT Filed: Jun. 21, 2023

(86) PCT No.: PCT/SE2023/050646
§ 371 (c)(1),
(2) Date: Nov. 4, 2024

(87) PCT Pub. No.: WO2024/019647
PCT Pub. Date: Jan. 25, 2024

(65) Prior Publication Data
US 2025/0276680 A1      Sep. 4, 2025

(30) Foreign Application Priority Data
Jul. 18, 2022    (SE) .................................... 2250919-4

(51) Int. Cl.
B60W 10/20          (2006.01)
B60W 10/184        (2012.01)
(Continued)

(52) U.S. Cl.
CPC .......... B60W 10/20 (2013.01); B60W 10/184 (2013.01); B60W 30/02 (2013.01);
(Continued)

(58) Field of Classification Search
CPC .... B60W 10/20; B60W 10/184; B60W 30/02; B60W 50/029; B60W 2050/0292;
(Continued)

(56) References Cited

U.S. PATENT DOCUMENTS 2,553,940 A     5/1951   Quartullo
2,820,872 A     1/1958   Carr
(Continued)

FOREIGN PATENT DOCUMENTS

AR           50759 A1     11/2006
CN          1491170 A      4/2004
(Continued)

OTHER PUBLICATIONS

Office Action issued in corresponding Chinese Patent Application No. 201980058242.7, Aug. 29, 2023, pp. 1-7.
(Continued)

*Primary Examiner* — Long T Tran
*Assistant Examiner* — Charles J Brauch
(74) *Attorney, Agent, or Firm* — Jeffrey S. Melcher; Melcher Patent Law PLLC

(57) ABSTRACT

The present invention relates to a system for vehicle motion control (100) of a vehicle with at least a steering system and one or more of a brake system (24) and a torque vectoring system, a number of sensors (11.21) for sensing at least vehicle speed or wheel speed, yaw rate and wheel angle, said vehicle motion control system comprising a Yaw Stability Control (YSC) functionality comprising an oversteer control function, wherein the YSC function is arranged to be fail-operational.

25 Claims, 4 Drawing Sheets

(51) Int. Cl.
  *B60W 30/02* (2012.01)
  *B60W 50/029* (2012.01)
(52) U.S. Cl.
  CPC ... *B60W 50/029* (2013.01); *B60W 2050/0292*
    (2013.01); *B60W 2510/207* (2013.01); *B60W*
                                    *2520/14* (2013.01)
(58) Field of Classification Search
  CPC ....... B60W 2510/207; B60W 2520/14; B60W
      2520/125; B60W 2540/18; B60W 10/16;
          B60W 10/12; B60W 10/18; B60W
        30/045; B60W 50/023; B60W 2720/14;
      B60T 2270/303; B60T 2270/404; B60T
              8/17554; B60Y 2300/82
  See application file for complete search history.

(56) References Cited

U.S. PATENT DOCUMENTS

| | | | |
|---|---|---|---|
| 4,441,572 | A | 4/1984 | Ito |
| 4,624,336 | A | 11/1986 | Eddy |
| 5,307,892 | A | 5/1994 | Phillips |
| 5,388,658 | A | 2/1995 | Ando |
| 5,406,155 | A | 4/1995 | Persson |
| 5,596,252 | A | 1/1997 | Shimizu |
| 5,925,082 | A | 7/1999 | Shimizu |
| 6,219,604 | B1 | 4/2001 | Dilger |
| 6,282,478 | B1 | 8/2001 | Akita |
| 6,384,598 | B1 | 5/2002 | Hobein |
| 6,546,322 | B2 | 4/2003 | Williams |
| 6,640,173 | B1 | 10/2003 | Zheng |
| 6,691,009 | B1 | 2/2004 | Yao |
| 6,694,239 | B1 | 2/2004 | Yao |
| 6,718,243 | B1 | 4/2004 | Yao |
| 6,757,601 | B1 | 6/2004 | Yao |
| 6,799,104 | B2 | 9/2004 | Yao |
| 6,895,318 | B1 | 5/2005 | Barton |
| 7,165,644 | B2 | 1/2007 | Offerle |
| 8,073,608 | B2 | 12/2011 | Hulten |
| 8,453,518 | B2 | 6/2013 | Diekmann |
| 8,567,554 | B2 | 10/2013 | Zaloga |
| 8,694,209 | B2 | 4/2014 | Tokimasa |
| 8,751,111 | B2 | 6/2014 | Wilson-Jones |
| 9,180,907 | B2 | 11/2015 | Deimel |
| 9,260,092 | B1 | 2/2016 | Lombroz |
| 9,421,883 | B2 | 8/2016 | Drako |
| 10,005,455 | B2 | 6/2018 | Hulten |
| 10,351,162 | B1 | 7/2019 | Katzourakis |
| 11,214,302 | B2 | 1/2022 | Weiefors |
| 2002/0019690 | A1 | 2/2002 | Masahiko |
| 2003/0014168 | A1 | 1/2003 | Williams |
| 2003/0220727 | A1 | 11/2003 | Husain |
| 2004/0016294 | A1 | 1/2004 | Sugitani |
| 2004/0019417 | A1 | 1/2004 | Yasui |
| 2004/0060765 | A1* | 4/2004 | Mattson ................ B60T 8/1755 |
| | | | 180/422 |
| 2004/0107032 | A1 | 6/2004 | Farrelly |
| 2004/0138796 | A1 | 7/2004 | Yao |
| 2004/0186641 | A1 | 9/2004 | Hironaka |
| 2004/0251061 | A1 | 12/2004 | Augustine |
| 2005/0189161 | A1 | 9/2005 | Zheng et al. |
| 2005/0189163 | A1 | 9/2005 | Barton |
| 2005/0209751 | A1 | 9/2005 | Kato |
| 2005/0234622 | A1 | 10/2005 | Pillar |
| 2005/0246101 | A1 | 11/2005 | Courtenay |
| 2006/0080016 | A1 | 4/2006 | Kasahara |
| 2006/0289226 | A1 | 12/2006 | Sugitani |
| 2007/0021889 | A1 | 1/2007 | Tsuchiya |
| 2007/0144824 | A1 | 6/2007 | Tamaki |
| 2007/0192005 | A1 | 8/2007 | Ishikawa |
| 2007/0199764 | A1 | 8/2007 | Kifuku |
| 2007/0256885 | A1 | 11/2007 | Ammon |
| 2007/0299580 | A1 | 12/2007 | Lin |
| 2008/0021613 | A1 | 1/2008 | Hamaguchi |

| | | | |
|---|---|---|---|
| 2008/0040002 | A1 | 2/2008 | Galkoswki |
| 2008/0066994 | A1 | 3/2008 | Fujita |
| 2008/0109134 | A1 | 5/2008 | Bolourchi |
| 2008/0164087 | A1 | 7/2008 | Koyama |
| 2008/0243340 | A1 | 10/2008 | Hung |
| 2009/0271070 | A1 | 10/2009 | Feller |
| 2009/0271074 | A1 | 10/2009 | Hulten |
| 2009/0299573 | A1 | 12/2009 | Thrun |
| 2009/0312909 | A1 | 12/2009 | Onuma |
| 2010/0072738 | A1 | 3/2010 | Szabela |
| 2010/0168964 | A1 | 7/2010 | Higashi |
| 2011/0010054 | A1 | 1/2011 | Wilson-Jones |
| 2011/0272204 | A1 | 11/2011 | Nell |
| 2012/0109464 | A1 | 5/2012 | Mizutani |
| 2012/0199414 | A1 | 8/2012 | Shimizu |
| 2013/0032430 | A1 | 2/2013 | Zaloga |
| 2013/0231830 | A1 | 9/2013 | Van Dan Elzen |
| 2014/0157922 | A1 | 6/2014 | Schneider |
| 2014/0238770 | A1 | 8/2014 | Namikawa |
| 2014/0291061 | A1 | 10/2014 | Deimel |
| 2015/0158528 | A1 | 6/2015 | Moshchuk |
| 2015/0175197 | A1 | 6/2015 | Heilig |
| 2015/0246687 | A1 | 9/2015 | Takeda |
| 2015/0251541 | A1 | 9/2015 | Drako |
| 2015/0259007 | A1 | 9/2015 | Di Cairano |
| 2015/0329141 | A1 | 11/2015 | Preijert |
| 2016/0090005 | A1 | 3/2016 | Drako |
| 2016/0159390 | A1 | 6/2016 | Tamaizumi |
| 2016/0272197 | A1 | 9/2016 | Hulten |
| 2017/0017734 | A1 | 1/2017 | Groh |
| 2017/0066476 | A1 | 3/2017 | Yoshio |
| 2017/0113714 | A1 | 4/2017 | Guerra |
| 2017/0247032 | A1 | 8/2017 | Lee |
| 2018/0086374 | A1 | 3/2018 | Subaru |
| 2018/0105181 | A1 | 4/2018 | Skold |
| 2018/0127025 | A1 | 5/2018 | Wijffels |
| 2018/0141588 | A1 | 5/2018 | Shimizu |
| 2018/0188705 | A1 | 7/2018 | Linger |
| 2018/0281844 | A1 | 10/2018 | Wijffels |
| 2018/0281845 | A1 | 10/2018 | Wijffels |
| 2018/0319422 | A1 | 11/2018 | Thyssenkrupp |
| 2019/0270482 | A1 | 9/2019 | Nakakuki |
| 2020/0108816 | A1 | 4/2020 | Velazquez alcantar |
| 2020/0361522 | A1 | 11/2020 | Weimin |
| 2021/0070265 | A1* | 3/2021 | Roether ............... B60W 10/20 |
| 2021/0129839 | A1 | 5/2021 | Hulten |
| 2021/0284230 | A1 | 9/2021 | Volkswagen |
| 2021/0389196 | A1 | 12/2021 | Kyocera |
| 2023/0087332 | A1 | 3/2023 | Dieckmann |

FOREIGN PATENT DOCUMENTS

| | | | |
|---|---|---|---|
| CN | 1867477 | A | 11/2006 |
| CN | 101119884 | A1 | 2/2008 |
| CN | 101450677 | B | 6/2009 |
| CN | 101657345 | B | 2/2010 |
| CN | 102114867 | A | 7/2011 |
| CN | 102470864 | A | 5/2012 |
| CN | 102612456 | A | 7/2012 |
| CN | 103303361 | B | 9/2013 |
| CN | 103895693 | A | 7/2014 |
| CN | 105644621 | A | 6/2016 |
| CN | 106494497 | A | 3/2017 |
| CN | 107380255 | A | 11/2017 |
| CN | 107531279 | A | 1/2018 |
| CN | 107792169 | A | 3/2018 |
| CN | 109153405 | A | 1/2019 |
| CN | 109415058 | A | 3/2019 |
| CN | 111108035 | B | 5/2020 |
| CN | 111315640 | B | 6/2020 |
| CN | 112074449 | B | 11/2020 |
| CN | 113365900 | A | 9/2021 |
| CN | 114502448 | A | 5/2022 |
| CN | 118695984 | A | 9/2024 |
| CN | 118871342 | A | 10/2024 |
| DE | 19539101 | A | 2/1997 |
| DE | 19912169 | A1 | 7/2000 |
| DE | 19941464 | A1 | 3/2001 |
| DE | 202011003716 | | 8/2012 |

(56) References Cited

FOREIGN PATENT DOCUMENTS

| | | | | |
|---|---|---|---|---|
| DE | 102017203456 | | 9/2018 | |
| DE | 102020117322 | | 1/2022 | |
| DE | 102020117322 | A1 * | 1/2022 | ............. B60T 8/885 |
| EP | 1193160 | A2 | 4/2002 | |
| EP | 1228941 | A2 | 8/2002 | |
| EP | 1577194 | A1 | 9/2005 | |
| EP | 1698540 | A1 | 9/2006 | |
| EP | 2070 804 | A1 | 6/2009 | |
| EP | 2070804 | | 6/2009 | |
| EP | 1867542 | B1 | 7/2009 | |
| EP | 3411280 | A1 | 12/2018 | |
| EP | 3684675 | B1 | 7/2020 | |
| EP | 3684676 | B1 | 7/2020 | |
| EP | 3768575 | A1 | 1/2021 | |
| EP | 3847077 | A1 | 7/2021 | |
| EP | 3887225 | A1 | 10/2021 | |
| EP | 4041616 | A1 | 8/2022 | |
| ES | 2772749 | T3 | 7/2020 | |
| FR | 2922848 | A1 | 5/2009 | |
| JP | 3178866 | A | 8/1991 | |
| JP | 2010047193 | | 3/2010 | |
| SE | 1751179 | C2 | 9/2017 | |
| SE | 1850315 | A1 | 3/2018 | |
| SE | 1951159-1 | | 10/2019 | |
| SE | 543719 | C2 | 6/2021 | |
| SE | 544124 | C2 | 1/2022 | |
| SE | 544243 | C2 | 3/2022 | |
| SE | 2250335 | A | 3/2022 | |
| SE | 2250146 | A1 | 8/2023 | |
| SE | 2250676 | A1 | 12/2023 | |
| WO | 111997 | A1 | 2/2001 | |
| WO | 135884 | A1 | 5/2001 | |
| WO | 02/22397 | A1 | 3/2002 | |
| WO | 2009/095442 | A1 | 6/2002 | |
| WO | 2003006300 | A2 | 1/2003 | |
| WO | 2006005730 | A1 | 1/2006 | |
| WO | 2010144049 | A1 | 6/2010 | |
| WO | 2012043683 | A1 | 4/2012 | |
| WO | 2017135884 | | 8/2017 | |
| WO | 2017135884 | A1 | 8/2017 | |
| WO | 2017184064 | | 10/2017 | |
| WO | 2019059838 | | 3/2018 | |
| WO | 2019182496 | | 9/2018 | |
| WO | 2019059829 | | 3/2019 | |
| WO | 2020050759 | | 3/2020 | |
| WO | 2021076025 | | 4/2021 | |
| WO | 2023177337 | | 9/2023 | |
| WO | 2024019647 | | 1/2024 | |

OTHER PUBLICATIONS

International Search Report issued in parent PCT/SE2019/050754, Nov. 29, 2019, pp. 1-2.
Written Opinion issued in parent PCT/SE2019/050754, Nov. 29, 2019, pp. 1-8.
International Search Report issued in parent PCT/SE2019/051097, Nov. 3, 2020, pp. 1-2.
Written Opinion issued in parent PCT/SE2019/051097, Nov. 3, 2020, pp. 1-6.
Search Report issued in corresponding Chinese Patent Application No. 201980078956.4, Jul. 19, 2023, pp. 1-3.
Office Action issued in corresponding Chinese Patent Application No. 201980078956.4, Jul. 19, 2023, pp. 1-5.
Effect of Wheel Geometry Parameters on Vehicle Steering, Rajvardhan et al (Year: 2011).
Variable Caster Steering, IEEE, Alberding et al (Year: 2014).
International Search Report issued in parent PCT/SE2020/050876, Nov. 3, 2020, pp. 1-3.

Written Opinion issued in parent PCT/SE2020/050876, Nov. 3, 2020, pp. 1-10.
RP Rajvardhan et al: Effect of Wheel Geometry Parameters on Vehicle Steering of Gravity CRC Constant Radius Cornering DOF Degrees of Freedom KPIA Kingpin Inclination Angle SAi Steering Axis Inclination SLC Single Lane Change, Sep. 30, 2010 (Sep. 30, 2010), pp. 11-18, XP055086764, Retrieved from the Internet:URL:http://www.msrsas.org/docs/sastech_jou rnals/archives/Sep2010/2.pdf[retrieved on Nov. 5, 2013).
Andrew S Ansara et al:Optimization of Front Suspension and Steering Parameters of an Off-road Car using Adams/Car Simulation,Sep. 30, 2017 (Sep. 30, 2017), XP055759859, Retrieved from the Internet: URL:https:/lwww.ijert_Org/research/optimiz ation--of-front-suspension-and-steering-par ameters--of-an-off-road-car-using-adamscar-Simulation-IJERTV61S090055.pdf [retrieved on Dec. 14, 2020).
Emanuele Bon Era et al: On the Influence of Suspension Geometry on Steering Feedback 11 , Applied Sciences, vol. 10, No. 12, Jun. 1, 2020 (Jun. 1, 2020), p. 4297, XP055759045, CH ISSN: 2076-3417, DOI: 10.3390/app10124297.
International Search Report issued in parent PCT/SE2023/050003, May 4, 2023, pp. 1-2.
Written Opinion issued in parent PCT/SE2023/050003, May 4, 2023, pp. 1-10.
International Search Report issued in parent PCT/SE2023/050157, Jul. 7, 2023, pp. 1-2.
Written Opinion issued in parent CT/SE2023/050157, Jul. 7, 2023, pp. 1-18.
International Search Report issued in parent PCT/SE2023/050455, Jul. 8, 2023, pp. 1-2.
Written Opinion issued in parent PCT/SE2023/050455, Jul. 8, 2023, pp. 1-11.
Search Report issued in corresponding Chinese patent application Serial No. 201780009900.4 on Mar. 16, 2020, pp. 1-3.
Office Action issued in corresponding Chinese patent application Serial No. 201780009900.4 on Mar. 20, 2020, pp. 1-10.
Decision to Grant in corresponding European Patent Application No. 17705188.5-1013, mailed Oct. 17, 2019, p. 1.
EPO, Int'l Search Report and Written Opinion in PCT/2017/050100, Apr. 20, 2017.
Decision to Grant in corresponding European Patent Application No. 17718757.2 mailed May 4, 2020, pp. 1-2.
Office Action issued in corresponding Chinese Patent Application No. 201780024423.9, Jun. 16, 2020, pp. 1-8, with translation pp. 1-3.
EPO, Int'l Search Report in PCT/2017/050382, Jul. 17, 2017.
EPO, Written Opinion in PCT/2017/050382, Jul. 17, 2017.
International Search Report issued in parent PCT/SE2018/050920, Feb. 18, 2019, pp. 1-3.
Written Opinion issued in parent PCT/SE2018/050920, Feb. 18, 2019, pp. 1-7.
International Search Report issued in parent PCT/SE2018/050966, Jan. 24, 2019, pp. 1-3.
Written Opinion issued in parent PCT/SE2018/050966, Jan. 24, 2019, pp. 1-7.
W0-2012043683-A 1 translation (Year: 2012).
CN-109415058-A (Year: 2019).
International Search Report issued in parent PCT/SE2019/050237, Jun. 13, 2019, pp. 1-8.
Written Opinion issued in parent PCT/SE2019/050237, Jun. 13, 2019, pp. 1-3.
EP-1867542-B1 translation (Year: 2009).
Swedish Search Report for Application 1951159-1, Mailed on Jun. 10, 2020.
International Search Report issued in parent PCT/SE2023/050646, Sep. 10, 2023, pp. 1-2.
Written Opinion issued in parent PCT/SE2023/050646, Sep. 10, 2023, pp. 1-16.

* cited by examiner

SYSTEM AND METHOD FOR VEHICLE MOTION CONTROL

TECHNICAL FIELD

The present invention relates to a system for vehicle motion control having the features of the first part of claim 1. The invention also relates to a method for vehicle motion control having the features of the first part of claim 24, and to a vehicle comprising such a motion control system.

BACKGROUND

Ground vehicles such as passenger cars are prone to instabilities, e.g. when performing evasive manoeuvres or when driving during low mu conditions, e.g. when there is ice or water on the road. They have therefore, since the early 90s, been equipped with a Yaw Stability Control (YSC) function, such as ESP™ (Electronic Stability Program). When a vehicle becomes unstable, it will result in oversteer, which is difficult for the driver to handle. The purpose of YSC is to stabilise the vehicle to enable a driver to maintain control of the vehicle, also for less skilled drivers. Through the introduction of YSC the number of fatalities were temporarily reduced by more than 30%. Later, however, the number of fatalities has started to increase again, at least partly as a result of drivers using the YSC's capability to extend the limits of controllable driving as will be further discussed below.

Typically, in order to make the task of controlling the vehicle easier, vehicles are made with an understeer behaviour. This means that they tend to steer less than the driver's intention. This understeer behaviour is not necessarily good for path following, but it makes it much easier for the driver to avoid instabilities, such as oversteering, with resulting loss of control.

With the introduction of YSC, vehicles at first were not made to understeer less. But over time, the robustness and level of proven-in-practice increased and, after several decades, vehicles are made less prone to understeer, and therefore more susceptible to instabilities.

At the same time, the early YSC was quite abrupt in the control, and hence not very comfortable. As a consequence thereof, drivers tended to avoid ending up in situations where the YSC was activated. This is considered an important reason for the number of fatalities in the beginning going down so dramatically. Over time, however, YSC has evolved and been made very smooth in its control, with the consequence that drivers tend to increase the speed, and "take advantage of" or rather misuse the YSC in their normal driving, resulting in the number of fatalities increasing again, almost to the same level as before the introduction of YSC. Additionally, in fact, many drivers of today may not even have experienced driving with a vehicle without an active YSC.

There is thus a built-in conflict between any position that the driver is responsible and should be able to control a sudden loss of YSC of the vehicle at any time, and the real world, where a driver trained in the vehicle's behaviour with an active YSC has come to rely on the system to extend the capability of the vehicle. In particular, with such a use of YSC, a malfunction of YSC will lead to a hazard, and more generally a function (YSC) made for driveability that may lead to a "misuse" thereof, and actually may involve risks and in some instances actually infer a risk of an increased number of fatalities.

YSC is used for lateral (or directional) stability of the vehicle. When the vehicle is operating in conditions when slip angles are below a limit, and has a neutral steer, relationship between yaw rate and steering wheel angle is substantially linear; the yaw rate is the product of steering wheel angle and yaw rate gain. Further, for a neutral steer vehicle with a negligible slip angle, the yaw rate is given by the lateral acceleration divided by the vehicle speed. These relationships can be used to establish an ideal yaw rate for given conditions. The actual yaw rate is measured using a yaw rate sensor, the difference between actual and ideal yaw rates is used for controlling yaw stability.

However, YSC is not designed as a safety critical system in safety standard ISO 26262, which is the standard within automotive according to which functions and/or systems with the potential of being hazardous are developed, and which offers advice on what is considered state-of-the-art for designing safety related functionality.

Irrespectively of whether it is argued that the driver is responsible or not, which is not the case in ISO 26262, it has been realized that controllability in the event of failure, as advised in ISO 26262, is not sufficient. ISO 26262 merely considers controllability in the event of failure of YSC.

In addition, current safety standard is developed for manually driven vehicles, considering the controllability for the driver to be able to handle certain situations. Through the introduction of autonomous vehicles, the problems will be even larger, since an autonomous vehicle will have an autonomous "driver" (auto-pilot), often based on artificial intelligence, which is trained on big data sets from normal drivers. That means that the auto-pilot actually is in parity with a normal driver, or worse, and even normal drivers do not cope with oversteer very well. Furthermore, for the path planning of autonomous vehicles, the sensors used can be cameras, radars, lidars. Such sensors are slow and need a lot of slow signal processing and filtering. A path planner can therefore not act as a means for avoiding oversteer.

Lately, with electrification of vehicles, there are hybrid vehicles and fully electrical vehicles. On hybrid and electrical vehicles, there are often electrical motors on the rear axle. For hybrid vehicles, the reason for arranging the electrical motor on the rear axle is that it will make the vehicle four-wheel drive, assuming that the combustion engine drives at the front axle for cost reasons. Another reason for rear-axle drive is a better acceleration. Nevertheless, given electrical rear-axle drive, there is also a need for regeneration at the rear axle as the electrical motor easily can be used as a generator. However, when the rear axle is used as a generator, the risk for loosing grip on the rear axle is even increased. This is especially likely to occur on a slippery surface like on snow and ice, but also on wet roads. That means that the regeneration also will infer a hazard.

It has been realized, however, that a motivation for the system not having to be developed as a safety critical system that was originally true and ethical, actually is no longer valid.

SUMMARY

It is therefore an object of the present invention to provide an improved system for vehicle motion control through which one or more of the above-mentioned problems can be solved and through which one or more of the shortcomings can be overcome.

It is a particular object of the present invention to provide an improved system for vehicle motion control through which safety can be increased.

It is particularly an object to provide a system for vehicle motion control through which enhanced safety is provided independently of driver skill and experience and/or driver use of an YSC functionality.

More particularly it is an object to provide a system for vehicle motion control through which the risk of a fatality in the case of a malfunction in YSC can be reduced.

Even more particularly it is an object to provide a system for vehicle motion control through which occurring oversteer effects created due to road conditions or evasive manoeuvres as well as through understeer effects created through YSC can be handled in a safe manner.

A particular object is to provide a system for vehicle motion control through which controllability and safety can be enhanced for autonomous vehicles.

Another particular object is to provide a system for vehicle motion control through which controllability safety can be enhanced for electrified vehicles, hybrid vehicles or fully electrical vehicles.

Further yet it is a particular object to provide a system for vehicle motion control through which introduced controllability hazard or risks for hazards associated with regeneration of electric motors at the rear axle in the case of slippery surfaces can be reduced for hybrid or fully electric vehicles.

Still further it is a particular object to provide a vehicle motion control system which is reliable and safe under varying conditions.

Other particular objects are to provide a vehicle motion control system which is cheap and easy to implement and fabricate and which can be used for different types of vehicles, vehicles run on conventional fuels, electric vehicles, hybrid vehicles, autonomous vehicles, and for conventional steering systems as well as for power assisted Steer-by-Wire (SbW) steering systems.

It is also an object to provide a method for vehicle motion control through which one or more of the above-mentioned objects are achieved.

It is also an object of the present invention to provide a vehicle with a vehicle motion control system through which one or more of the above-mentioned objects are achieved.

Therefore, a vehicle motion control system as initially referred to is provided which has the characterizing features of claim 1. A method for vehicle motion control having the characterizing features of claim 24 is therefore also provided as well as a vehicle comprising such a motion control system.

Advantageous embodiments are given by the respective appended dependent claims and are described in the detailed description respectively.

It will be appreciated that features of the invention are susceptible to being combined in any combination without departing from the scope of the invention as defined by the accompanying claims.

BRIEF DESCRIPTION OF THE DRAWINGS

The invention will in the following be further described, in a non-limiting manner, and with reference to the accompanying drawings, in which.

DEFINITIONS

Figure 1:
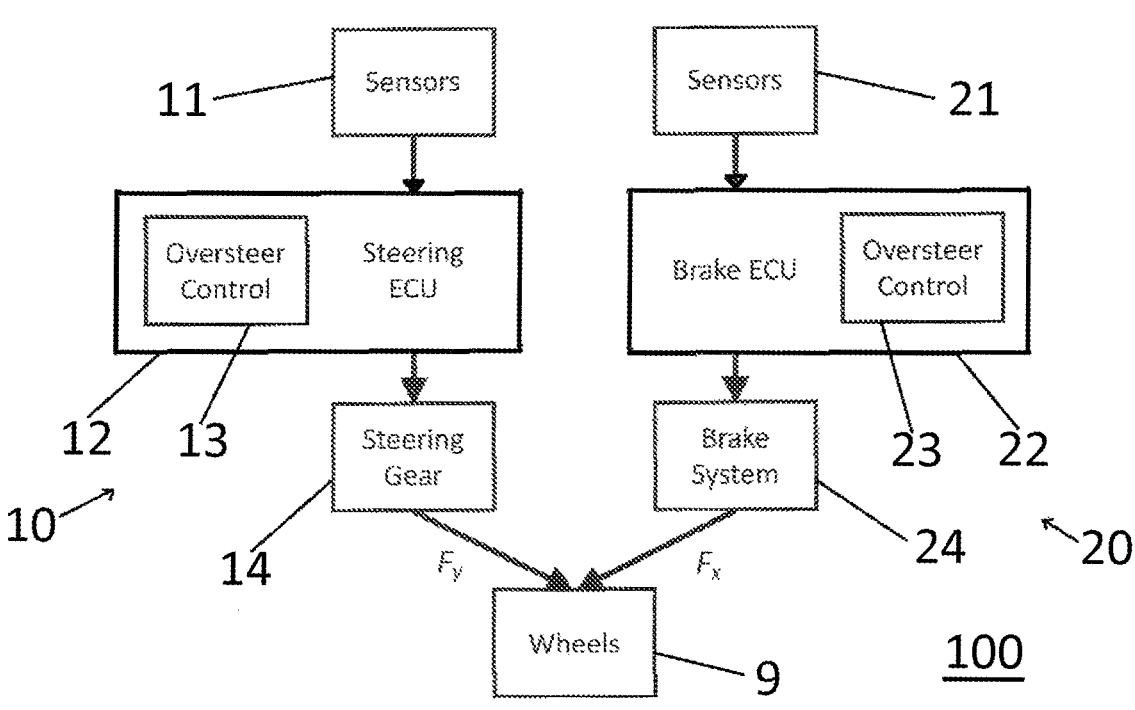
FIG. 1. is a schematic block diagram illustrating a vehicle motion control system according to a first embodiment of the present invention.

For the purposes of describing the present invention, and to facilitate the understanding thereof, the following definitions are given, some of which will be relied upon in the detailed description of advantageous embodiments:

Functions

A function describes what a design will do or accomplish, with an emphasis on input-output transformations. Every customer feature is a function: It will do or accomplish something for the customer. Functions are realized by systems. As an example, the function of power assisted steering is to provide the driver with steering assistance. The inputs to the power steering assistance function are typically vehicle speed, steering-wheel angle and torsion-bar torque, which are transformed to an assistance, as an output, which is actuated by a power assisted steering system.

Transformation: An operation on one or more states which gives one or more other states as a result. That means that a transformation can be used, with its tuneable parameters, to create a relation between the input value/s and the output value/s with arbitrary tuneable shape. A transformation can have time-varying parameters that are even dependent on other values, so that the transformation is a function with parameters that themselves are functions. An example of such a transformation is a vehicle speed dependent assistance of a power assisted steering system, with the inputs vehicle speed, steering-wheel angle and torsion-bar torque. The assistance is calculated mathematically from the inputs and the tuning parameters. It can, generally, also be realized by hardware, as in the case of hydraulic power assisted steering or a mix thereof.

A subfunction is a part of a function. A function can be broken down to an infinite number of subfunctions in an infinite number of ways. A function will accomplish is the sum of what its subfunctions accomplish.

The following subfunctions are used in the function representations of the different embodiments:

Input signal sensing: The subfunction of achieving a sensor signal from a sensor subsystem. The input can be a current, voltage or digital raw-value and the output is a sensor signal value.

Sensor fusion: The subfunction of achieving a verified signal of a state from information from several sensor signal values. In the case of e.g. a sensor fusion with requirements to be fail-operational, the subfunction is to use e.g. a pattern "two out of three" where three sensor signals are used and if one value differ more than a threshold, the output is based on the other two signal values only, producing an output that is verified and "fused" from several input signals.

Target calculation: The subfunction of achieving a target value for the control based on the input signals from the sensor fusion.

Control: The subfunction calculating an assistance output that minimizing a control error between the target value of the target calculation and a corresponding state signal from a sensor fusion. The output is an assistance request.

Actuation: The subfunction of actuating the assistance request.

Fail-operational is defined as the ability of a part, which is a function, subfunction, system or subsystem, to maintain its operation even if there is a single fault of the inputs or subfunctions/subsystems to that part.

Fail-safe is defined as the ability of a part, which is a function, subfunction, system or subsystem, to detect a single fault of the inputs or subfunctions/subsystems to that part and safely shut down its operation.

States

State: A number of variables of a dynamic system which describe the state of the system at a given point in time.

A vehicle state is defined as a translational or rotational position, velocity or acceleration, or any from these before-mentioned states derived states such as e.g. a vehicle slip angle, which is the angle between the vehicle local x-axis and the vehicle speed vector.

A vehicle axis and coordinate system where x is in the horizontal plane and in the forward direction of travel. y is in the horizontal plane, perpendicular to x and point to the left. z points upward.

Yaw direction: the rotation around the z-axis of the vehicle, which is directed upwards and perpendicular to the xy-plane in which the vehicle is to be found.

Lateral direction: the y-axis of the vehicle, directed to the left and perpendicular to the xz-plane.

Longitudinal direction: the x-axis of the vehicle, directed forwards and perpendicular to the yz-plane.

Straight-ahead position: Position of the steering-wheel when the vehicle is moving straight ahead in the x-direction.

Slip angle: Lateral velocity of the vehicle divided by the longitudinal velocity of the vehicle.

Yaw state of a vehicle: The yaw position, yaw rate or yaw acceleration of the vehicle at a given point intime.

Lateral vehicle state: A lateral position, lateral velocity, or lateral acceleration of the vehicle at a given point in time. As slip angle is the lateral velocity divided by the longitudinal velocity of the vehicle, lateral vehicle state implicitly incorporates slip angle.

Yaw and/or lateral vehicle state: Any of the yaw states and/or any of the lateral vehicle states including slip angle and any linear combinations of all these states.

A steering angle is an angle in the steering system that influences the lateral acceleration or curvature of the vehicle, measured somewhere in the steering system, where such steering angles can be:

The front-wheel angle and in the case for e.g. Ackermann steering, the steering angle is defined as the mean value of the angles of the two front wheels.

The articulation angle of an articulated vehicle.

The rear-wheel steering angle in the case of a rear-wheel steered vehicle.

A combination of the front-wheel angle and the rear-wheel angle in the case of an all-wheel steered vehicle.

It can also be measured somewhere else in the steering system, such as e.g. the steering column, and then be multiplied by the ratio between the column and the road wheels, and for the other setups mutatis mutandis.

A torsion-bar torque is a torque measured using a sensor that is sensitive to a twist of a specific torsion bar that is mounted somewhere in the steering column.

A steering-wheel torque is the torque resulting from the force applied by the driver to the steering wheel. This steering-wheel torque is normally approximated by the torsion-bar torque and/or indirectly through monitoring current to a steering feedback actuator.

A driver torque is equal to the steering-wheel torque.

Steering torque: The part of the torque applied by the driver via the steering wheel which corresponds to the vehicle state(s) which the driver wishes to attain. The steering-wheel torque corresponds to several types of feedback, namely friction (from the tyres and steering system), damping (from the tyres and steering system), returnability of the steering wheel owing to front-wheel suspension and steering system design and feedback of the yaw and or lateral vehicle state. The steering torque is the steering-wheel torque with all feedback types removed except the feedback of the yaw and or lateral vehicle state.

Slip angle of the tyres: The angle between the direction of the wheel and the direction of the motion of the wheel.

Assistance torque: the torque applied by the steering actuator.

Degradation: reduction of the output of the actual actuator or output of other actuators such as e.g. a degradation of the vehicle maximum speed if the YSC redundancy does not meet fail-operational state.

Systems

A system is the means for accomplishing a function. As an example, the function of power assisted steering is to provide the driver with steering assistance. The function output, an assistance request, is actuated by a power assisted steering system.

Steering systems: Different types of steering systems accomplish different kinds of functions. A steering system has the function of providing a steering position (steering angle) and a steering feedback to the driver. Systems for steering position has the function to influence the steering angle.

List of steering systems relevant for the current invention:

EPS (Electric Power Steering) is a steering system with an actuator for electric assistance of the steering.

Another specific type of steering system has an angle overlay actuator. An angle overlay actuator is an actuator that is used to achieve a relative angle somewhere in the steering column.

Steer-by-wire systems are steering systems where the column is changed to electrical wires. Such systems have two major parts, namely a steering feedback part to provide feedback torque to the driver, and a steering rack to provide steering angle to the road wheels.

Yet another type of steering system is a steering system for autonomous driving, where the feedback part, in the case of full automation, can be removed completely (otherwise a feedback part, just like in the case of steer-by-wire, can be used) but it has a steering rack to provide steering angle to the road wheels.

Brake system: A brake system has the function of providing wheel brake torques or forces to the individual wheels.

Torque vectoring system: A system for providing wheel torques, both positive (driving) and negative (braking) to the individual wheels. Torque vectoring is used to achieve a torque vector in the yaw direction of the vehicle by using individual wheel motors or controllable differentials to differentiate the torques or forces between the left and right side, giving a yaw torque on the vehicle.

A subsystem is here a part or an element or an arrangement of e.g. a vehicle. An example of a subsystem of the steering system for electric power steering is the steering ECU, the steering assistance motor, the steering column, the steering rack, etcetera.

An ECU is an electric control unit that is used to read analogue sensor signals and digital signals, that can come over e.g. a signal bus, perform any type of computations, such as e.g. perform a control task and actuate actuators, either via a sent analogue or digital signal or by directly controlling e.g. an electric motor from a motor control stage.

Actuators

An actuator is a mechanism or system that is operated mechanically or by an ECU and converts a source of energy, typically electric current, hydraulic fluid pressure, or pneumatic pressure, into a motion, a force or a torque.

A vehicle state actuator is an actuator that, when actuated, influences one or several vehicle states. Vehicle state actuators are e.g. brake actuators, steering (gear) actuators, engine, controllable four-wheel-drive clutches, controllable differentials, active dampers, electric or hydraulic wheel motors and electrically or hydraulically driven axles.

Steering actuator: A device to influence the change in the vehicle's yaw and/or lateral vehicle state.

An EPS (Electric Power Steering) actuator is an actuator for electric assistance of the steering.

A SbW (steer-by-wire) actuator is an actuator for electric positioning of the steering.

An angle overlay actuator is an actuator that is used to achieve a relative angle somewhere in the steering column.

Brake actuators: Wheel brakes, to provide wheel torques or forces to the individual wheels.

Torque vectoring actuators: Actuators for providing wheel torques, both positive (driving) and negative (braking) to the individual wheels by using individual wheel motors or controllable differentials to differentiate the torques or forces between the left and right side, giving a yaw torque on the vehicle.

Sensors

A torsion-bar torque sensor is a sensor which is sensitive to a twist of a torsion bar that is mounted somewhere in the steering column.

A Torque and Angle Sensor (TAS) is a sensor for sensing torque and angle. It generally provides information about a driver input and/or about the steering subsystem state.

An ABS sensor or wheel speed sensor is a sensor measuring a rotational wheel speed. Wheel speeds can be used to calculate vehicle states such as vehicle speed and vehicle yaw rate.

A rate gyro sensor measures the angular speed around an axis in yaw, pitch or roll direction, e.g. sensing a vehicle state, providing vehicle state information.

An acceleration sensor or accelerometer measures acceleration in longitudinal, lateral or vertical direction, e.g. sensing a vehicle state, providing vehicle state information.

A position sensor measures the position. It can be a local, regional or world-wide coverage; generally referred to as GPS, e.g. sensing a vehicle state, providing vehicle state information.

Signals

A signal bus is a transmission path on which signals can be read and/or transmitted.

An input signal can for example be the measure of a torque resulting from the force applied by the driver via the steering wheel, measured at the steering wheel or at a component mechanically connected to the steering wheel or a signal from which this quantity can be derived.

Control

Control of an actuator: achieving a desired state in the actuator in a controlled manner.

Controller: algorithm in the process which controls and strives to maintain a reference or target value in balance by controlling the result through closed loop and/or a feed-forward control. Controllability describes the ability of an external input to move the internal state, an actual value, of a system from any initial state to an arbitrary other final state, a target value, in a finite time interval, thus minimising the difference between the target value and the actual value, i.e. the control error.

A vehicle state controller is defined as a dynamic function for achieving a target state in a vehicle in a controlled manner. That is, to minimise the difference between the target state and the actual state, i.e. the control error, in a controlled way.

A target value, reference value or request is a set point for the actuator that is achieved by the use of either a closed loop controller and/or a feed-forward controller.

A vehicle model is a mathematical model that transforms a road-wheel angle and a vehicle speed to a number of vehicle yaw and/or lateral states, e.g. one or more of vehicle yaw rate and acceleration, vehicle lateral speed and acceleration and vehicle body sideslip angle.

An extended steering feedback torque is an additional feedback that should be felt by the driver, such as e.g. a haptic feedback or an additional feedback of a safety function.

Torque and/or angle reference control (TAC) comprises steering feel control (SFC) and/or steering position control (SPC), respectively. For the steering feel control, it is the control of the steering-wheel torque that the driver feels that is the subject matter, and in steering position control, it is the control of the road-wheel angles, and specifically for a front-wheel steered vehicle, the control of the front axle road-wheel angle, here referred to as the steering angle.

Functionality is the combination of a function and the system to realize the function. To have a functionality, there must be something accomplished and realized.

It should be clear that the present invention is not limited to any exemplified vehicle states, subsystem states or driver inputs, nor to any exemplified states. Different types of sensors and sensor setups can be used, also for sensing other or additional states etc.

DETAILED DESCRIPTION

According to the present invention, the YSC functionality is considered as safety critical, since, in general terms and among other things, the risk of losing control over the vehicle for normal drivers occurs so frequently and a loss of control would have so severe consequences. The system and/or function to mitigate the risk must be operational with a very high rate—typically not generating a fault once every 107 hours, and therefore a structured functional safety design is provided in which the YSC functionality is fail operational.

As referred to above, functions and/or systems with the potential of being hazardous, are typically developed in accordance with safety standards. Within automotive branch the standard ISO 26262 offers advice on what is considered state-of-the-art for designing safety related functionality. If a hazard, like vehicle instability, or lane departure is considered high risk, mitigation of the risk needs to be fail-operational to be considered sufficiently safe. Fail-operational functions and systems can be achieved in many different ways, where redundancy is one, and some different patterns for providing a fail-operational system or function will be further described below.

FIG. 1 is a schematic block diagram of a first embodiment of a system for vehicle motion control 100 with an YSC functionality 100 which is fail operational. The YSC functionality here comprises a first YSC (Yaw Stability Control) system 10 and a second YSC (Yaw Stability Control) system 20. The first and second YSCs 10,20 are independent, and in one embodiment both are fail-safe, allowed to have faults, but arranged to shut down if a fault is detected. The diagnostic coverage is high in order to detect such faults, faults which may lead to a hazard. Since the first and second YSC systems/functions 10,20 are independent, when one is shut down, the other will still be working while maintaining a sufficient safety. When one system/function only is used, there may be provided for e.g. a degraded mode, such as e.g. providing a warning to the driver, reducing speed or any other appropriate measure.

According to the invention the first YSC 10 is arranged to control yaw stability by controlling steering whereas the second YSC 20 is arranged to control yaw stability by controlling braking.

The first YSC system 10 comprises a steering control function comprising a steering ECU 12 with an oversteer control functionality 13 and comprises, or is connected to, a sensor arrangement 11 comprising a number of sensors for measuring at least vehicle speed, yaw rate and road wheel angle, directly or allowing calculation thereof.

The sensor arrangement 11 particularly comprises driver input sensors for sensing steering-wheel angle or any other angle in the steering system related to the steering wheel or to the road wheels, or a torsion-bar torque sensor. The driver intended path or the target value for the yaw and/or the lateral vehicle state, the target yaw and/lateral vehicle state can be calculated in any of two main ways, based on steering angle or based on steering torque, as also further described with reference to FIG. 3 below. The target yaw and/lateral vehicle state can e.g. be calculated as in EP 2 440 442, the steering angle can be used together with a vehicle model to achieve the driver intended path. When the vehicle is operating in conditions when slip angles of the tyres are below a limit, the relationship between yaw rate and steering angle is substantially linear; the quasi-static yaw rate is the product of steering angle and yaw gain of a linear bicycle model. Further, the yaw rate is given by the lateral acceleration divided by the vehicle speed. In a more general way, a linear or non-linear, quasi-static or dynamic bicycle model, a bicycle model, can be used to establish an ideal yaw and/or lateral vehicle state for given conditions from the steering angle and the vehicle speed. For a steering angle based target yaw and/or lateral vehicle state the bicycle model is used as a dynamic function between the vehicle speed and the steering angle giving the target yaw and/or lateral vehicle state, the yaw and/or lateral vehicle state that would have been in ideal road conditions.

In other embodiments the steering torque can be transformed to a target yaw and/or lateral vehicle state as also further described below with reference to FIG. 3.

The sensor arrangement 11 further comprises a sensor for sensing vehicle yaw rate and/or sensors for sensing vehicle lateral acceleration or other vehicle lateral states such as e.g. wheel speed based yaw rate. In some embodiments two inputs are used in order to allow for plausibility checks between them.

The steering ECU 12 oversteer control functionality is arranged to minimise the error between a target and an actual vehicle state by the use of steering gear assistance torque, or in case of steer-by-wire or angle overlay, steering position, and is arranged to control, provide a request to, the steering gear 14, which by means of a steering actuator will actuate the request to minimise the vehicle state error by controlling the lateral forces on the tyres of the road wheel 9 angles making the vehicle assume the desired direction.

The second YSC system 20 comprises a steering control function comprising a brake ECU 22 with an oversteer control functionality 23 and here comprises, or is connected to, a separate sensor arrangement 21 comprising a number of sensors at least for measuring vehicle speed, yaw rate and road wheel angle, directly or allowing calculation thereof.

The sensor arrangement 21 particularly comprises driver input sensors for sensing steering-wheel angle or any other angle in the steering system related to the steering wheel or to the road wheels, or a torsion-bar torque sensor. The driver intended path can be calculated as in EP 2 440 442, i.e. the angle can be used together with a vehicle model to achieve the driver intended path, or alternatively the torque can be transformed to a target yaw and/or lateral vehicle state as for the first YSC system 10. The sensor arrangement 21 further also comprises a sensor for sensing vehicle yaw rate and/or sensors for sensing vehicle lateral acceleration or other vehicle lateral states such as e.g. wheel speed based yaw rate. In some embodiments two inputs are used in order to allow for plausibility checks between them.

The brake ECU 22 oversteer control functionality is arranged to minimise the error between a target and an actual vehicle state by using brake torques, and arranged to control, provide a request to, the brake system 24, which will by means of a brake actuator actuate the request to minimise the vehicle state error by controlling the longitudinal forces on the tyres of the road wheels 9.

As referred to above the first and/or second YSC sensor arrangements 11,21 may also or additionally comprise a torsion bar torque sensor, for determining a desired or target yaw and/or lateral vehicle state, although it is not necessary for controlling yaw stability.

It should be clear that the sensor arrangements also may comprise other, additional, sensors or use sensor combinations through which vehicle speed, yaw rate and road wheel angle can be obtained through calculations, e.g. yaw, wheel speed (for each wheel), or any other sensors.

In particular embodiments additional redundancy may be provided for through the first and second YSC systems 10,20 monitoring each other e.g. through sending of sensor signals between the first and second YSC systems 10,20, and/or through exchanging information between the first and second YSC system 10,20 about target lateral vehicle state. It is also possible to, in addition to a brake actuator, use additional actuators to achieve redundant control, such as e.g. one or more of a front-axle steering actuator (for conventional steering), front- and rear-axle steering actuators, steer-by-wire actuators, angle overlay actuators, all-wheel-drive clutch actuators (to control the distribution between front and rear axle drive in order to balance the vehicle yaw rate), torque vectoring (i.e. addition of drive torque to individual wheels, with a similar effect as braking individual wheels).

In an advantageous implementation the first YSC system 10 is fail safe, and particularly is of level ASIL (automotive safety integrity level)—C according to ISO 26262 and the second YSC system 20 is fail safe, and particularly is of level ASIL—C according to ISO 26262 and, considering the hazard of lane departure due to oversteer from an ISO 26262 perspective, the risk calculation takes the following steps to achieve the automotive safety integrity level:

Risk Management recognizes that consideration of the severity of a possible injury is modified by how likely the injury is to happen; that is, for a given hazard, a hazardous event is considered a lower risk if it is less likely to happen. The likelihood of an injurious hazard is further classified according to a combination of exposure (E), the relative expected frequency of the operational conditions in which the injury can possibly happen, and control (C); the relative likelihood that the driver can act to prevent the injury.

Severity classification S: The severity of not being able to hold the lane would be S3 (Life-threatening (survival uncertain) to fatal injuries) due to the potentially fatal outcome.

Controllability classification C: The controllability for oversteer would be C3, since it can be difficult to control or even uncontrollable.

Exposure classification E: The frequency of the risk for the occurrence for wet road conditions would be E3, medium probability, described as occurring more than once per month in the standard, resulting in safety integrity level ASIL C, which is a measure of the effort required to ensure that the YSC remains operational.

Thus, in this embodiment ASIL allocation (decomposing a fail-operational ASIL C requirement) in safety critical systems is achieved by using two independent fail-safe systems YSCs 10,20 in parallel; one fail-operational system allocated to two fail-safe systems. In order for a system to be fail-safe, it should be safe to shut off, but errors that can cause hazardous behaviour must be detected, here to an ASIL C-level, and result in a shut off of the erroneous function/system.

Fail-operationality can also be achieved by redundancy, where three parts, functions, systems, subfunctions or subsystems, are used in a way so that if one part differs more than a certain value from the other two, the two valid parts are used—"two out of three".

Sensor fusion is applied and will be further discussed below with reference to FIGS. 3,4.

Figure 2:
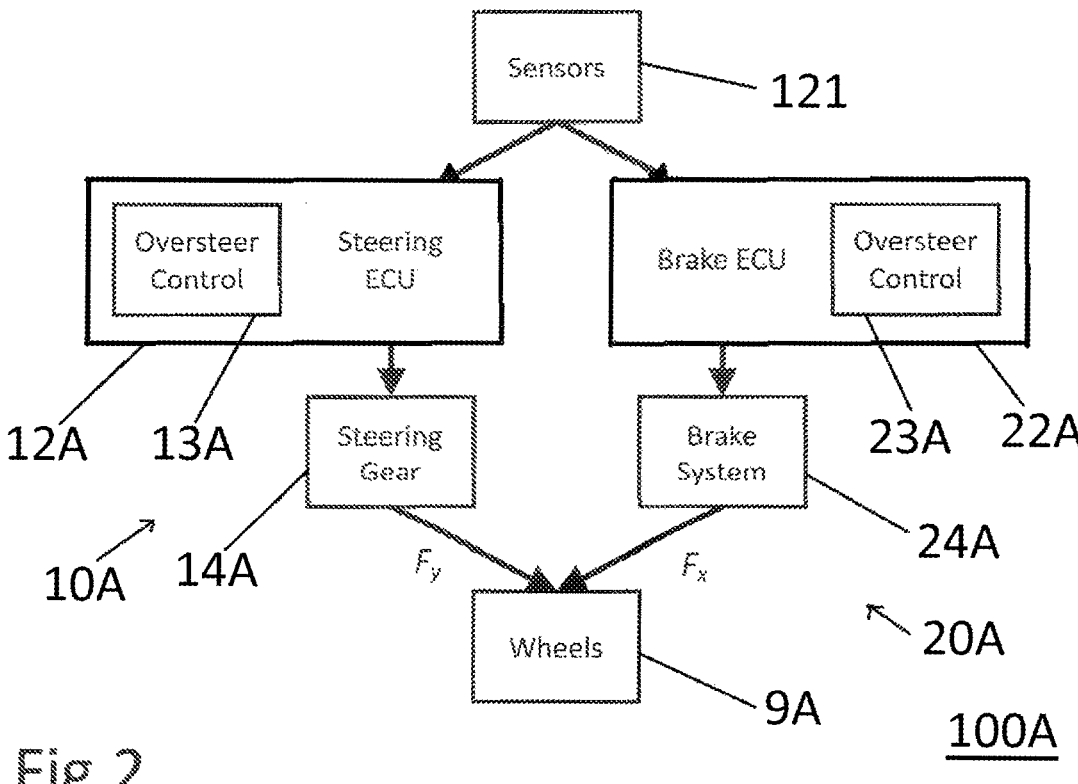
FIG. 2 is a schematic block diagram illustrating a vehicle motion control system according to a second embodiment of the present invention.

FIG. 2 is a schematic block diagram of a second embodiment of a system for vehicle motion control with an YSC functionality 100A which is fail operational. The YSC functionality 100A comprises a first YSC system 10A and a second YSC system 20A which can be said to be partly independent as will further described below.

The first and second YSC systems 10A,20A are dependent to the extent that they are connected to a common sensor arrangement 121, but both are fail-safe, allowed to have faults, but arranged to shut down if a fault is detected; when one is shut down, the other will still be working while maintaining a sufficient safety. As in the embodiment discussed with reference to FIG. 1, when one system/function only is used, there may be provided for e.g. a degraded mode, such as e.g. providing a warning to the driver, reducing speed or any other appropriate measure.

As described with reference to the embodiment shown in FIG. 1, the first YSC system 10A is arranged to control yaw stability by controlling steering whereas the second YSC system 20A is arranged to control yaw stability by controlling braking.

The first YSC system 10A comprises a steering control function comprising a steering ECU 12A with an oversteer control functionality 13A and comprises, or is connected to, a common sensor arrangement 121 comprising a number of sensors for measuring at least vehicle speed, yaw rate and road wheel angle, directly or allowing calculation thereof.

The sensor arrangement 121 particularly comprises driver input sensors for sensing steering-wheel angle or any other angle in the steering system related to the steering wheel or to the road wheels, or a torsion-bar torque sensor. The driver intended path can be calculated as in EP 2 440 442, i.e. the angle can be used together with a vehicle model to achieve the driver intended path, or alternatively the torque can be transformed to a target yaw and/or lateral vehicle state. The sensor arrangement 121 further comprises a sensor for sensing vehicle yaw rate and/or sensors for sensing vehicle lateral acceleration or other vehicle lateral states such as e.g. wheel speed based yaw rate. In some embodiments two inputs are used in order to allow for plausibility checks between them.

The steering ECU 12A oversteer control functionality is arranged to minimise the error between a target and an actual vehicle state by the use of steering gear assistance torque, or in case of steer-by-wire, steering position, and is arranged to control, provide a request to, the steering gear 14A, which by means of a steering system will actuate the request to minimise the vehicle state error by controlling the lateral forces on the tyres of the road wheel 9A angles making the vehicle assume the desired direction.

The second YSC system 20A comprises a steering control function comprising a brake ECU 22A with an oversteer control functionality 23A and here comprises, or also is connected to, the common sensor arrangement 121, which hence is common for the first and second steering control functions.

As in the embodiment discussed with reference to FIG. 1, the brake ECU 22A oversteer control functionality is arranged to minimise the error between a target and an actual vehicle state by the use of brake torques, and arranged to control, provide a request to, the steering gear 14A, which will by means of a brake actuator actuate the request to minimise the vehicle state error by controlling the longitudinal forces on the tyres of the road wheels 9A.

As referred to above the common YSC sensor arrangement 121 may also, or additionally, comprise a torsion bar torque sensor, for determining a desired or target yaw and/or lateral vehicle state, although it is not necessary for controlling yaw stability.

It should be clear that the sensor arrangement also may comprise other, additional, sensors or use sensor combinations through which vehicle speed, yaw rate and road wheel angle can be obtained through calculations, e.g. yaw, wheel speed (for each wheel), or any other sensors.

However, in one embodiment, in order for the first and second YSCs to be fail-safe, the critical sensors of the common sensor arrangement 121 needs to be fail-operational, e.g. arranged in an architecture designed to tolerate safe as well as dangerous failures, e.g. the two-out-of three (2oo3) architecture in which two units out of three are required for the system to operate, and which provides both safety and high availability. The two outputs from the three sensor units being wired or evaluated in a so-called voting circuit or algorithm, determining the actual output forming the majority output. I.e. here the logic pattern two-out-of-three is provided, with three critical sensors of the same kind, wherein two need to provide the same output. Sensor fusion will be further discussed below with reference to FIGS. 3,5.

Another common sensor arrangement 121 setup is to use four sensors measuring directly or indirectly the information of interest and use the sensors in pairs of two, to monitor one-another within the pair. There are hence, schematically, two fail-safe pairs forming the fail-operational function, which is another pattern for fail-operational functions, as is well known for a person skilled in the art.

The arrangements in the sensor arrangement 121 can be any mix of the patterns two-out-of-three and two fail-safe pairs. For example, the vehicle speed can be achieved from the four wheel speeds by schematically arrange them in two pairs monitoring each-other, and hence forming two fail-safe portions, that will result in a fail-operational vehicle speed as previously discussed. The yaw-rate could use voting between two yaw-rate sensor values and a virtual yaw-rate value calculated from the wheel speeds.

In particular embodiments additional redundancy may be provided for through the first and second YSC systems 10A,20A monitoring each other e.g. through sending of sensor signals between the first and second YSC system 10A,20A, and/or through exchanging information between the first and second YSC system 10A,20A about target lateral vehicle state. It is also possible to, in addition to a brake actuator, use additional actuators to achieve redundant control, such as e.g. one or more of a front-axle steering actuator (for conventional steering), front- and rear-axle steering actuators, steer-by-wire or angle overlay actuators, all-wheel-drive clutch actuators (to control the distribution between front and rear axle drive in order to balance the vehicle yaw rate), torque vectoring (i.e. adding of drive torque to individual wheels, with a similar effect as braking individual wheels).

In an advantageous implementation the first and second YSC systems 10A,20A both are fail safe, allowed to have faults, but arranged to shut down if a fault is detected, and particularly are of level ASIL (automotive safety integrity level)—C according to ISO 26262, so that if one of them shuts down, the other will still operate.

Alternatively, the pattern two out of three is used for the systems i.e. three independent systems/functions and monitor the outcome of the systems/functions and if one is showing different results above a given threshold, that sub-system/function is shut down. As only one of three is shut down, the other two will work, even with the ability to detect further faults. Also here there can be reasons for degradations.

The use of degradad states is assumed to be within the normal work of a person skilled in the art, and therefore, deeper description thereof is outside the scope of this description.

These two strategies can also be mixed for different sub-systems/functions. This will be shown in the embodiments.

Figure 3:
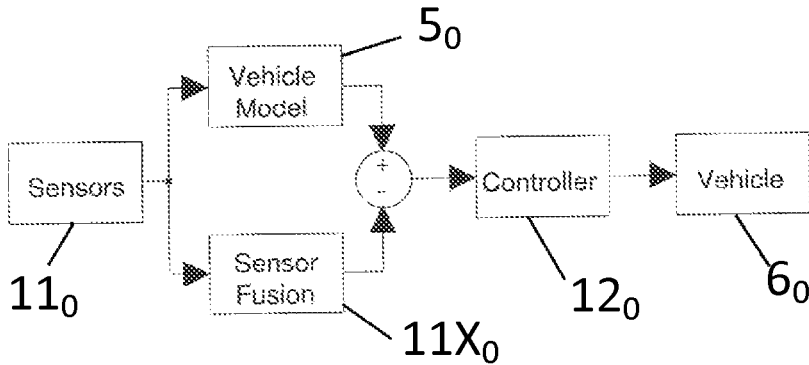
FIG. 3 is a schematic control scheme illustrating a general state of the art implementation of vehicle motion control using a vehicle model and sensor fusion.

FIG. 3 is a general control scheme showing a general control of lateral vehicle states. In FIG. 3, in the vehicle model $5_0$, e.g. as described in WO 2010/144049, the target lateral vehicle state (e.g. vehicle yaw-rate) is calculated from road-wheel angle and vehicle speed by the use of a bicycle vehicle model. The road-wheel angle can be calculated from any angle in the steering system. The vehicle $6_0$ speed can be calculated from the road-wheel speeds.

The target lateral vehicle state obtained from the vehicle model $5_0$ is compared with a sensed value obtained via signals from sensors $11_0$ undergone a fusion in sensor fusion means $11X_0$, generating a control error. In controller $12_0$ the control error is minimised by controlling one or several actuators having influence on the lateral vehicle state to be controlled (the controller can be of many kinds as should be known to any person skilled in the art).

The driver intended path or the target value for the yaw and/or lateral vehicle state, the target yaw and/or lateral vehicle state, can be calculated in two major ways: Target value based on steering angle or target based on steering torque.

When the vehicle is operating in conditions when slip angles of the tyres are below a limit, relationship between yaw rate and steering angle is substantially linear; the quasi-static yaw rate is the product of steering angle and yaw gain of a linear bicycle model. Further, the yaw rate is given by the lateral acceleration divided by the vehicle speed. In a more general way, a linear or non-linear, quasi-static or dynamic bicycle model, a bicycle model, can be used to establish an ideal yaw and/or lateral vehicle state for given conditions from the steering angle and the vehicle speed.

Steering angle based target yaw and/or lateral vehicle state:

Here, the bicycle model is used as a dynamic function between the vehicle speed and the steering angle giving the target yaw and/or lateral vehicle state, the yaw and/or lateral vehicle state that would have been in ideal road conditions.

Steering torque based target yaw and/or lateral vehicle state (see further EP 2 440 442):

Here, the steering torque is first calculated from the steering-wheel torque. Then, as there is a relation between the steering torque and the yaw and/or lateral vehicle state that the steering torque is feedback of (such as e.g. steering torque as a function of lateral acceleration state of the vehicle), this relation can be inverted. This inverted relation can be used to, from the steering torque, calculate a target yaw and/or lateral vehicle state.

The actual yaw and/or lateral vehicle state corresponding to the target yaw and/or lateral vehicle state is measured using sensors, improved and checked in a sensor fusion. In a case when the slip angle is the state to control, the slip angle is calculated from the yaw rate and lateral acceleration in a way known for a person skilled in the art.

Figure 4:
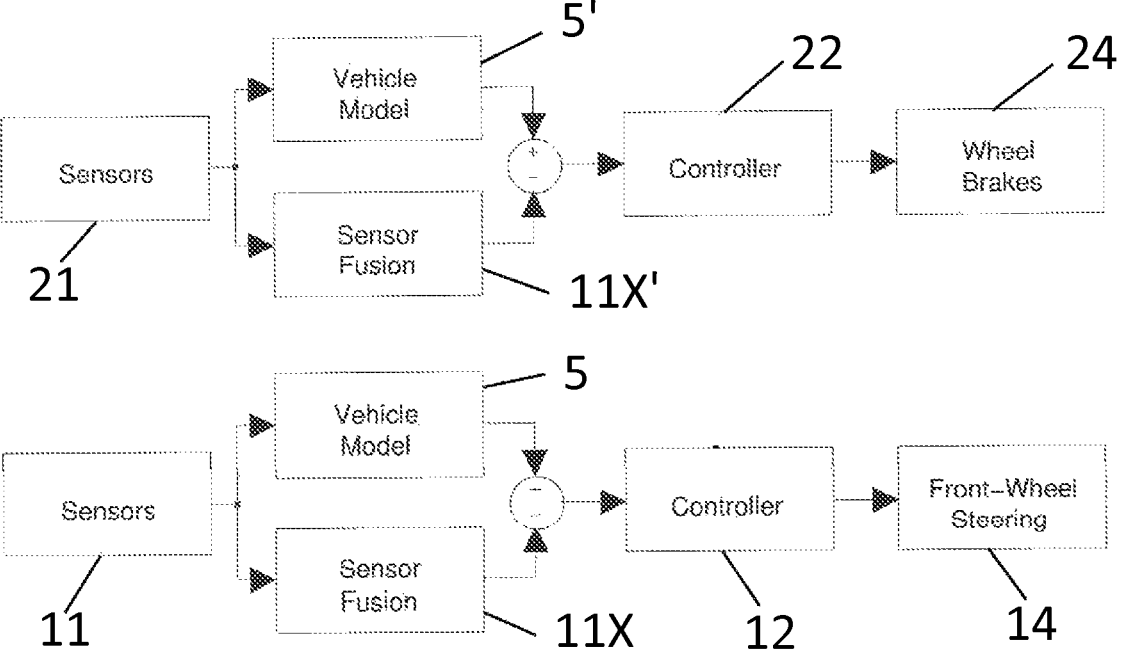
FIG. 4 is a schematic control scheme illustrating an exemplary implementation of vehicle motion control in a vehicle motion control system according to an embodiment with two separate sensor arrangements as illustrated in FIG. 1

FIG. 4 is a control scheme corresponding to one implementation of an embodiment as described with reference to FIG. 1 of the present invention. There is one general vehicle state controller 12 for the front-wheel steering 14 and one general vehicle state controller 23 for the wheel brakes or the brake system 24 using a respective input control error obtained through comparing a target value from a respective vehicle model 5,5' and a sensor value from a respective sensor fusion 11X,11X'. The sensor arrangements 11,21 need to be redundant in such a way that faults can be detected. Either by using two sensors, so that if they show different values outside a threshold, there is a fault and the function is shut off. Or alternatively, one sensor and a plausibility check by the use of some other sensor. One example is to use a yaw-rate sensor for the lateral vehicle state, and check the plausibility of the sensed yaw rate by using two wheel speeds on the same axle and calculate the yaw rate from them as the difference in speed divided by the track width.

Figure 5:
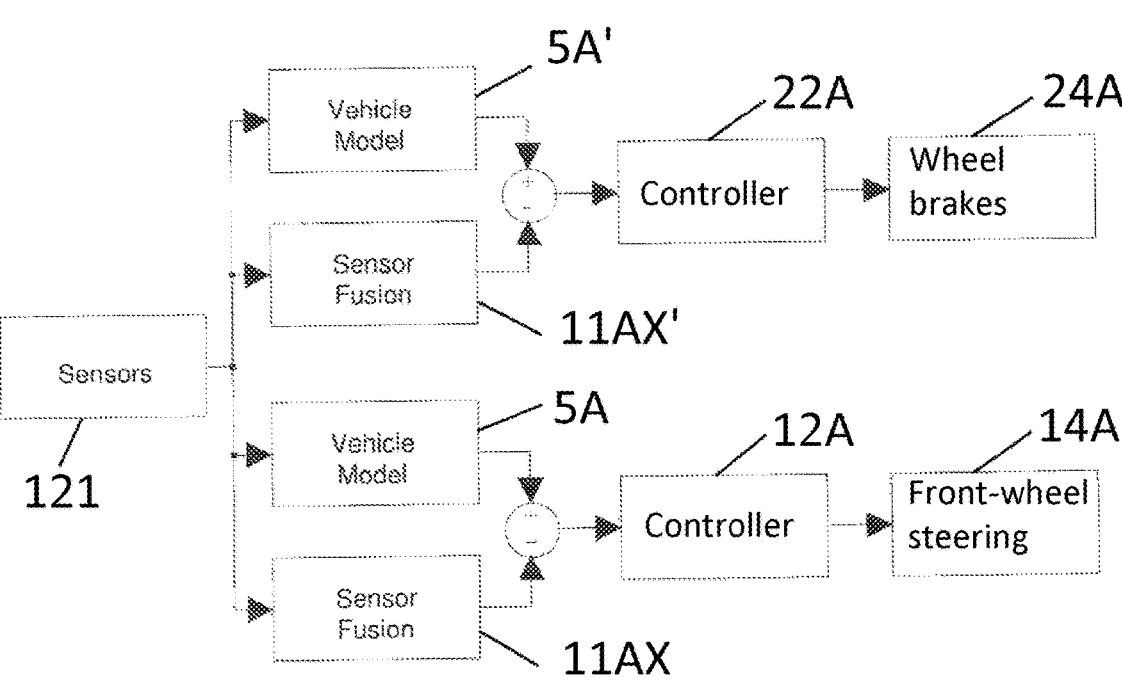
FIG. 5 is a schematic control scheme illustrating an exemplary implementation of vehicle motion control in a vehicle motion control system with one common sensor arrangement, as illustrated in FIG. 3

FIG. 5 is a control scheme corresponding to an implementation of an embodiment as described with reference to FIG. 2 of the present invention. In an embodiment as illustrated in FIG. 2 and through the control scheme in FIG. 5 there is still one controller 13A for the front-wheel steering 14A and one controller 23A for the wheel brakes or the brake system 24A using a respective input control error obtained through comparing a target value from a respective vehicle model 5A,5A' and a sensor value from a respective sensor fusion 11AX,11AX' based on input values from common sensor arrangement 121. Here, the critical sensors of sensor arrangement need to be fail-operational. One way of achieving fail-operational behaviour is to make the information redundant with at least the "pattern" two out of three. An example of sensor fusion for such an embodiment is further described with reference to FIG. 6 below.

Figure 6:
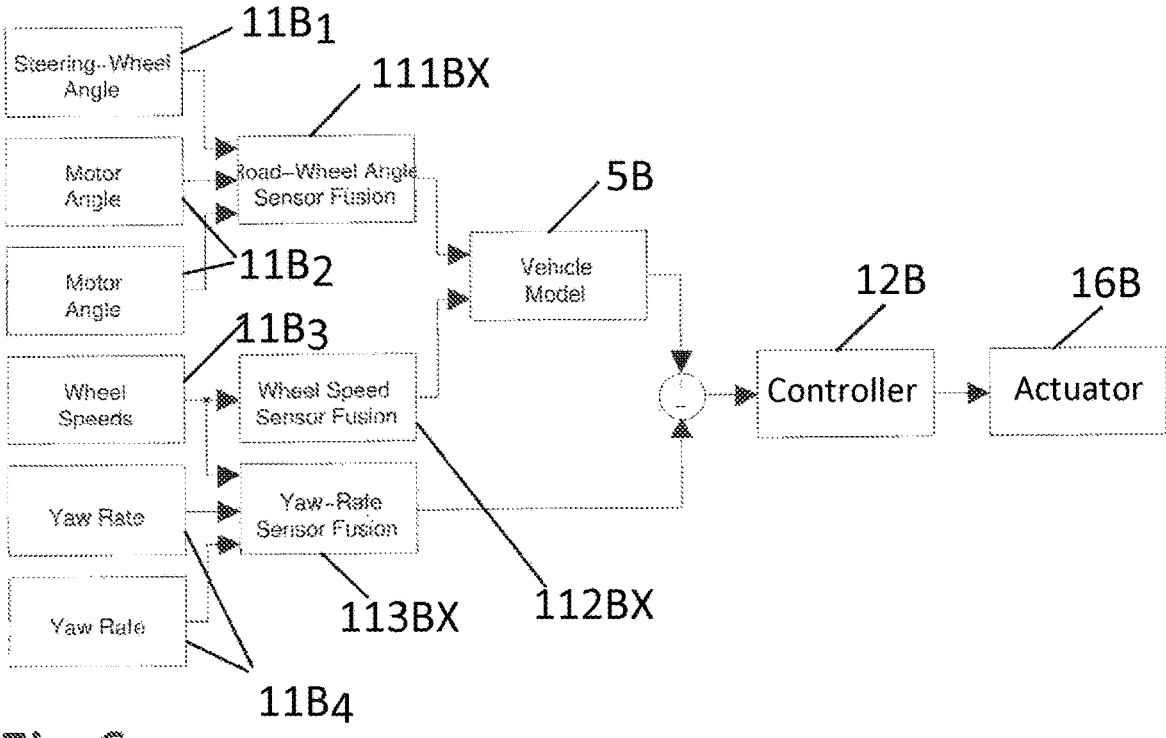
FIG. 6 is a schematic control scheme illustrating an implementation of vehicle motion control according to an embodiment with a fail-operational, common, sensor set-up.

FIG. 6 discloses an exemplary implementation of a fail-operational sensor setup and shows an exemplary sensor fusion in detail e.g. for an embodiment as described with reference to FIGS. 2 and 5 using a controller 12B and a vehicle model 5B for an actuator 16B of e.g. a steering gear or a brake actuator. A common sensor setup is here used. Here, only one controller is shown, but for the full understanding of the embodiment, there is a parallel set of controllers, and potentially also vehicle models, that both uses the same sensors, and potentially also sensor fusions.

As an example, for a road wheel angle sensor fusion function 111BX, road-wheel angle is calculated from a steering-wheel angle obtained from a steering-wheel angle sensor $11B_1$ times the ratio between steering wheel and road wheels. Furthermore, two motor angle sensors $11B_2$ are here used (in an assistance motor) times the ratio between the assistance motor and the road wheels hence in total providing three calculated road-wheel angles. Using three road-wheel angles calculated in such a manner, the pattern "two out of three" is used in the sensor fusion to provide a "voted" fail-operational road-wheel angle to the vehicle model 5B. If the voting scheme detects one value out of range, degradation can be done as described earlier.

A wheel speed sensor fusion function 112BX is used in which the wheel speeds are treated similarly as for the road wheel angle sensor fusion described above, but, here, the wheel speeds are four (four wheels) and the vehicle speed can use "two out of three" for a number of sets of wheel-speed sensors $11B_3$. The "voted" fail-operational vehicle speed, i.e. the vehicle speed delivered to the vehicle model 5B, is the output of the wheel speed sensor fusion 112BX.

A yaw-rate sensor fusion function 113BX here uses two yaw-rate sensors $11B_4$ and one calculated yaw rate from wheel speed sensors $11B_3$ and the pattern "two-out-of-three" providing as output a fail-operational yaw-rate signal to the vehicle model 5B.

Figure 7:
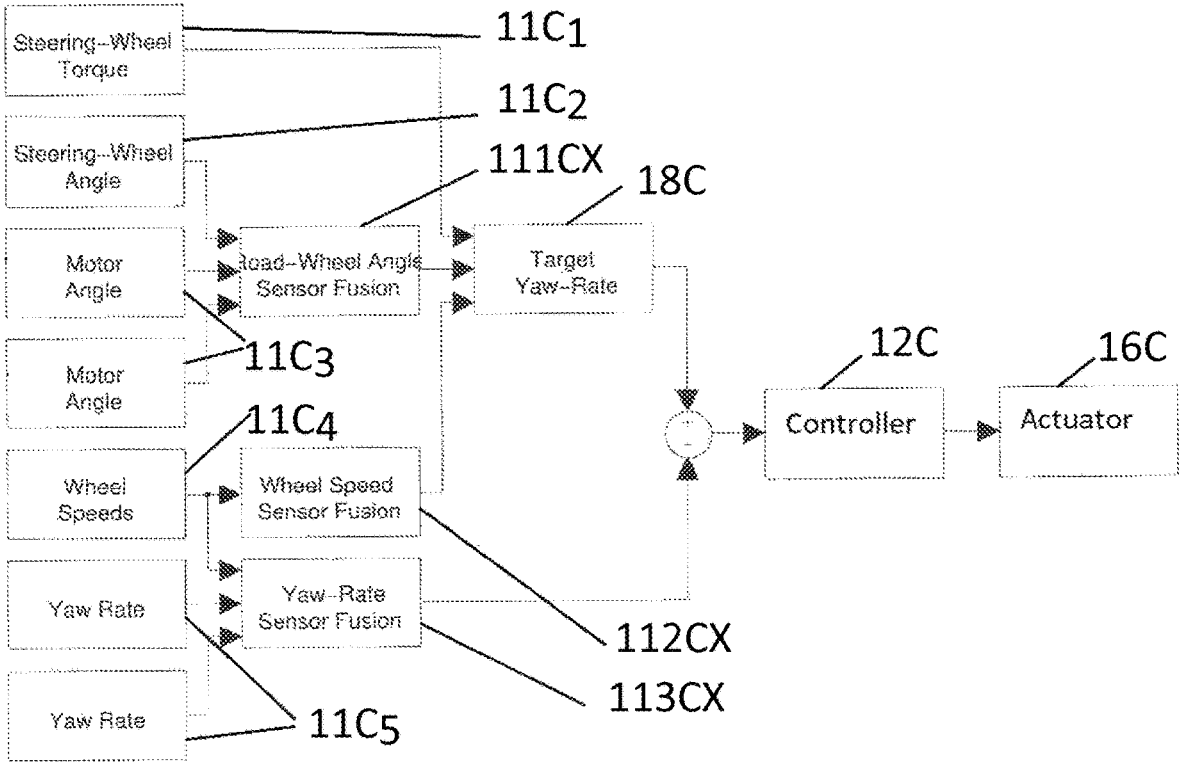
FIG. 7 is a schematic control scheme illustrating an implementation of vehicle motion control according to an alternative embodiment with a fail-operational common sensor set-up.

FIG. 7 is a control scheme discloses an exemplary implementation of a fail-operational sensor setup and shows an exemplary sensor fusion in detail e.g. for an embodiment described with reference to FIGS. 2 and 5 using a controller 12C and a vehicle model 5C for an actuator 16C of e.g. a steering gear or a brake actuator. Also in FIG. 7 only one controller is shown, but for the full understanding of the embodiment, there is a parallel set of controllers, and potentially also vehicle models, that both uses the same sensors, and potentially also sensor fusions. Through the embodiment illustrated in FIG. 7 an exemplary way of calculation of a target yaw rate according to one embodiment of the present invention, also based on using a common sensor arrangement as in described with reference to FIGS. 2 and 5, is disclosed.

In an embodiment as schematically illustrated through the control scheme of FIG. 7, a target yaw rate 18C is calculated slightly different from the other embodiments. Here, steering-wheel torque (often sensed by two torsion-bar torque sensors to achieve fail-safe status) is used as an indicative of a driver intended lateral vehicle state. The target lateral vehicle state is calculated from steering-wheel angle or from road-wheel angle, steering-wheel torque and the vehicle speed using steering wheel torque sensors $11C_1$, steering wheel angle sensors $11C_2$, two motor angle sensor setups $11C_3$, wheel speed sensors $11C_4$ and two yaw rate sensor setups $11C_5$.

For the sensor fusions in the sensor fusion functions (road-wheel angle sensor function 111CX, wheel speed sensor fusion 112CX and yaw-rate speed function 113CX) as also exemplified above using "two out of three", there is only need for one sensor fusion for that specific signal to be able to control both brakes and steering in a fail-operational manner.

For the sensor fusions (like the steering-wheel torque) with only two sensors, only fail-safe is achieved. That means that to be able to use a common sensor setup, the torsion-bar torque sensor (for sensing steering-wheel torque) needs to be fail-operational, with example three sensors and a "two out of three" voting scheme.

If steering-wheel torque is only used for the steering control, two sensors are enough, as each control path will then be fail-safe, forming two independent fail-safe controllers, which together is fail-operational.

According to the inventive concept, and as also described or exemplified above, the division between two fail safe functions or systems and one fail-operational function or system can be provided anywhere and on any level in the YSC functionality control scheme and all combinations of two fail-safe systems (or arrangements) or functions and two-out-of-three systems (or arrangements) or functions are possible.

In particular, the inventive concept covers any combination of independent fail-safe systems or functions and/or fail-operational subsystems or fail-operational functions such as e.g. input signal sensing, sensor fusion functions, target yaw and/or lateral vehicle state calculations, control, actuation to provide a fail-operational YSC functionality.

It is clear, also from the descriptions of the figures above, that the YSC functionality needs to be fail-operational. Furthermore, it can be fail-operational by using two independent fail-safe functionalities, where the sensors can be independent or common, but in the case of common ones, the input sensing needs to be fail-operational.

Generalising the knowledge gain so far gives that there are two "patterns" for fail-operational functionality used, namely "two out of three" and "two independent fail-safe". These two can be used in any full combinatory for the subfunctions/subsystems and even parts of them. It has been shown that a common sensor package that uses "two out of three" can be used in combination with "two independent fail-safe" functions/systems for the rest of the parts. Any combination of these two patterns can be used for the following functions, here also called sub-functions:

input signal sensing, sensor fusion, target calculation, control, and actuation, and subsystems. It can even be used differently between the different input signals, like vehicle speed, yaw rate and steering angle. It can, as the patterns are general, be used differently with any granularity in any subfunction/subsystem structure.

In some cases, there is no need for redundancy, for example when a component either is proven in practice to have failure rates low enough in comparison to the required safety related failure rates, or in practice is duplicated. Such components are often mechanical, like steering column and so forth, and such sub-functions and/or sub-systems can also be used as parts of a redundant function/system.

A special case for "two independent fail-safe" sub-functions or sub-systems is to have the two independent parts built together. An example of such a sub-system is a six-phase motor. which can be seen as two three-phase motors built together, and where the magnets can be seen as mechanical elements that are proven in practice.

In the examples above, independent fail-safe systems are used, where one is the steering system, of any kind mentioned in the definitions, and the brake system. Another system for controlling the longitudinal forces on the wheels is torque vectoring. Therefore, torque vectoring can be used instead of braking for one of the independent fail-safe systems proving a fail-operational YSC functionality.

Further, according to the invention, as the YSC functionality must be fail-operational, any combinations of independent fail-safe systems can be used:

steering system and brake system (as described in the figures), steering system and torque vectoring system, brake system and torque vectoring system.

Further, according to the invention, as the YSC functionality must be fail-operational, any single system that is fail-operational can be used, such as:

fail-operational steering system, fail-operational brake system, and fail-operational torque vectoring system.

A steering position control functionality for steer-by-wire or autonomous driving is fail-operational (as there is no torque from the driver in the path from the steering wheel, if any, to the wheels, and hence no fall-back) and can be used in combination with a fail-operational YSC functionality. The same reasoning can be used for the brake system and for the torque vectoring system.

The control diagrams shown in FIGS. 6 and 7 may be implemented both for at least two fail safe systems, as described with reference to FIGS. 1 and 2, but also for a fail-operational subsystem, in which case there does not need to be any further controller, or two branches.

According to the invention, the YSC functionality as a whole (realized through software, system and system components, functions or subsystems) is redundant, and the redundant YSC functionality is provided by means of the steering and two or more of steering system actuators (redundancy is achieved through duplication or triplication of those parts of the steering which are not proven in practice as discussed above), or one (or more) steering system actuators and a braking actuator and/or a steering system actuator and a torque vectoring actuator or a brake actuator and a torque vectoring actuator or any other actuator combination.

It is an advantage that through a fail-operational YSC functionality, i.e. in its entirety, the total of the YSC functionality, according to the invention vehicles can be made with less understeer, as the vehicle stability is made fail-operational safe. A less understeer vehicle will have increased cornering capabilities and hence be safer.

It is another advantage that through controlling one or more selected yaw and/or lateral vehicle states, the YSC functionality can be made fail operational.

It is also an advantage that a fail-operational YSC functionality allows for vehicles to be handled in a safe manner also by unexperienced drivers even on wet and slippery roads, without loss of control.

Another advantage is that it allows for vehicles to be driven autonomously, where the driver is taken away, and hence is not available as the main driver with YSC as the redundancy, in a safe manner.

Still another advantage is that rear axle regeneration can be used in a safe manner as potential risk of instability is redundantly handled.

It should be clear that the inventive concept also covers embodiments with a steering arrangement comprising for example a yoke, joystick or any other input device instead of a steering wheel, and that the inventive concept is applicable for traditional steering systems of road vehicles comprising a mechanical connection between the steering wheel and the steerable wheels as for other steering systems not having a mechanical connection, often referred to as SbW, steer-by-wire, systems. It should be clear that the invention is not limited to the specifically illustrated embodiments, but that it can be varied in a number of ways within the scope of the appended claims, and features of the different embodiments can be combined. In particular it should be clear that a driver intended path or the target value for the yaw and/or lateral vehicle state, the target yaw and/or lateral vehicle state, can be calculated in based on steering angle or based on steering torque as described with reference to FIG. 1 also for any other embodiment described or falling within the scope of the claims.

The invention claimed is:

1. A system for vehicle motion control of a vehicle with a steering system, and/or a brake system, and/or a torque vectoring system, and a number of sensor arrangements comprising sensors for sensing, directly and/or allowing calculation of, at least vehicle speed or wheel speed, yaw rate and steering angle, said vehicle motion control system comprising a Yaw Stability Control (YSC) functionality with an oversteer control functionality, wherein the YSC functionality is arranged to be fail-operational and comprises at least two YSC systems such that when one is shut down, the other will still be working, each of which being connected to one or more of the sensor arrangements comprising a number of sensors, the at least two YSC systems each comprising a controller comprising an oversteer control functionality for controlling the vehicle path by controlling a yaw and/or lateral vehicle state, said at least two YSC systems comprises at least two of one or more YSC systems arranged to act on the/a steering system of the vehicle by acting on one or more steering system actuators comprising steering system gear or position actuators, an YSC system, which is arranged to act on the/a braking system of the vehicle by acting on one or more brake system actuators and an YSC system, which is arranged to act on the/a torque vectoring system of the vehicle by acting on one or more torque vectoring system actuators, in any combination;

wherein the sensor arrangement(s) at least comprise(s) sensors collecting information allowing determination of vehicle velocity, steering angle and at least one yaw and/or lateral vehicle state, either through direct sensing or through calculation;

wherein the, or each, sensor arrangement comprises at least one or more sensors for allowing calculation of one or more target yaw and/or lateral vehicle states using one or more of steering angle, vehicle speed, by means of a vehicle model or calculated using a steering angle, a torsion-bar torque and an inverse steering torque feedback calculation, the steering torque being a feedback or function of the yaw and/or lateral vehicle state, and, sensing or calculation of an actual yaw and/or lateral vehicle state and a difference between the/a target and the/an actual state being established or calculated, forming at least one control error and wherein the control error(s) is/are input to each controller; and wherein the, or each, control error is used for input to the steering control function, and/or to the braking control function, and/or to the torque vectoring function, and the steering control function and/or the braking control function and/or the torque vectoring function is/are adapted to minimize an input control error by controlling one or more steering actuators and/or brake actuators and/or torque vectoring actuators respectively.

2. The system for vehicle motion control according to claim 1, wherein the sensor arrangement(s) further at least comprise(s) sensor(s) collecting information allowing determination of driver or torsion-bar torque.

3. The system for vehicle motion control according to claim 1, wherein the sensing or calculation of an actual yaw and/or lateral vehicle state is a vehicle yaw rate, vehicle lateral acceleration or vehicle slip.

4. The system for vehicle motion control according to claim 1, wherein the at least two YSC systems comprises a first YSC system with a controller comprising a steering control function comprising an ECU for steering control comprising an oversteer control function and is arranged to act on the vehicle steering system by acting on one or more steering system actuators comprising steering system gear or position actuators and a second YSC system with a controller comprising a braking control function comprising an ECU with an oversteer control function and is arranged to act on a vehicle braking system by acting on one or more brake system actuators.

5. The system for vehicle motion control at least according to claim 4, wherein the steering control function comprising an oversteer control function of one of the at least two YSC systems is arranged to minimize an error between a target yaw and/or lateral vehicle state and an actual yaw and/or lateral vehicle state by controlling a steering system actuator controlling the steering angle generating lateral forces on wheel tires of the vehicle.

6. The system for vehicle motion control at least according to claim 1, wherein the braking control function comprising an oversteer control function of one of the at least two YSC systems is arranged to minimize an error between a target yaw and/or lateral vehicle state and an actual yaw and/or lateral vehicle state by controlling a braking or a torque vectoring actuator controlling longitudinal forces on wheel tires of the vehicle.

7. The system for vehicle motion control according to claim 1, wherein the at least one yaw and/or lateral vehicle state comprises at least one or more of vehicle wheel speed, vehicle angular speed around an axis in yaw, pitch or roll direction, acceleration in longitudinal, lateral or vertical direction, vehicle position, slip angle, lateral acceleration or a linear combination thereof.

8. The system for vehicle motion control according to claim 1, wherein the at least two YSC systems are independent.

9. The system for vehicle motion control according to claim 8, wherein the at least two YSC systems are fail-safe.

10. The system for vehicle motion control according to claim 9, wherein the at least two YSC systems are fail-safe meeting ASIL-C requirements.

11. The system for vehicle motion control according to claim 1, wherein the system comprises two sensor arrangements, a first sensor arrangement for the first YSC system and a second sensor arrangement for the second YSC system, and for each of said sensor arrangements, critical sensors for determining at least vehicle velocity, steering angle and at least one yaw and/or lateral vehicle state are redundant allowing detection of faults, and if a fault is detected for a critical sensor of the first or second sensor arrangement, the YSC-functionality of the respective YSC-system is shut off.

12. A system for vehicle motion control of a vehicle with a steering system, and/or a brake system, and/or a torque vectoring system, and a number of sensor arrangements comprising sensors for sensing, directly and/or allowing calculation of, at least vehicle speed or wheel speed, yaw rate and steering angle, said vehicle motion control system comprising a Yaw Stability Control (YSC) functionality with an oversteer control functionality;

wherein the YSC functionality is arranged to be fail-operational and comprises at least two YSC systems such that when one is shut down, the other will still be working, each of which being connected to one or more of the sensor arrangements comprising a number of sensors, the at least two YSC systems each comprising a controller comprising an oversteer control functionality for controlling the vehicle path by controlling a yaw and/or lateral vehicle state, said at least two YSC systems comprises at least two of one or more YSC systems arranged to act on the/a steering system of the vehicle by acting on one or more steering system actuators comprising steering system gear or position actuators, an YSC system, which is arranged to act on the/a braking system of the vehicle by acting on one or more brake system actuators and an YSC system, which is arranged to act on the/a torque vectoring system of the vehicle by acting on one or more torque vectoring system actuators, in any combination; and one sensor arrangement which is common for the first YSC system and for the second YSC system, and in that critical sensors for determining at least vehicle velocity, steering angle and at least one yaw and/or lateral vehicle state at least are triple redundant following a two-out-of-three logic.

13. The system for vehicle motion control according to according to claim 12, wherein the common sensor arrangement is set-up or arranged to be fail-operational.

14. The system for vehicle motion control according to claim 13, wherein the sensor arrangement comprises a steering wheel angle sensor and two motor angle sensors allowing calculation of three road wheel angles and a road wheel angle sensor fusion function implementing two-out-of-three logic to provide a road wheel angle or steering angle signal to a vehicle model of the first and of the second YSC system, wheel speed sensors for sensing four wheel speeds and a wheel speed sensor fusion function implementing two-out-of-three logic to provide a vehicle speed signal to the vehicle model of the first and of the second YSC system, and two yaw rate sensors for provide two yaw rate signals to a yaw rate sensor fusion function, said yaw rate sensor fusion function further being arranged to calculate a third yaw rate from a wheel speed signal from the wheel speed sensors, thus implementing two-out-of-three logic to provide a yaw-rate signal to the control errors to the controllers of the first and of the second YSC system.

15. The system for vehicle motion control according to claim 12, wherein the sensor arrangement comprises three steering wheel torque sensors, a steering wheel angle sensor and two motor angle sensors providing signals to a steering angle sensor fusion function implementing two-out-of-three logic for calculation of a target yaw and/or lateral vehicle state in a calculation function, wheel speed sensors for sensing four wheel speeds and a wheel speed sensor fusion function implementing two-out-of-three logic to provide a vehicle speed signal to the target yaw and/or lateral vehicle state calculation function, and two yaw rate sensors for providing two yaw rate signals to a yaw rate sensor fusion function, said yaw rate sensor fusion function further being arranged to calculate a third yaw rate from a wheel speed signal from the wheel speed sensors, thus implementing two-out-of-three logic to provide an actual yaw and/or vehicle state signal to a control error calculation function, the yaw and/or lateral vehicle state calculation function providing a target yaw and/or lateral vehicle state signal to the control error calculation, for input of the calculated control error(s) to the controllers of the first and of the second YSC system.

16. The system for vehicle motion control according to claim 1, wherein the fail-operational YSC functionality is provided by means of one or more fail-operational vehicle systems or a combination of fail-safe and fail-operational subsystems or subfunctions.

17. The system for vehicle motion control according to claim 16, wherein the one or more fail-operational systems are a vehicle fail-operational steering system and/or a fail-operational braking system and/or a fail-operational torque vectoring system.

18. The system for vehicle motion control according to claim 17, wherein the fail-operational steering system and/or a fail-operational braking system and/or a fail-operational torque vectoring system is achieved by means of a combination of independent failsafe and fail-operational subsystems or sub-functions comprising an input signal sensing arrangement, sensor fusion arrangement, target calculation, control system, actuating arrangement, a steering system, brake system or torque vectoring system with double ECU's, a steering system with double motors, or common sensors.

19. The system for vehicle motion control according to claim 1, wherein the system is adapted for use in a steer-by-wire steering system or a wireless steering system.

20. The system for vehicle motion control according to claim 1, wherein the system is adapted for use in an autonomous vehicle with a fail-operational steering system.

21. A vehicle comprising a system for vehicle motion control according to claim 1, wherein the vehicle is a car, a bus, a truck, an autonomous car, bus, truck or similar, a hybrid vehicle or a fully electrical vehicle.

22. A method for vehicle motion control of a vehicle with a steering system, and/or a brake system, and/or a torque vectoring system, and a number of sensor arrangements comprising sensors for sensing, directly and/or allowing calculation of, at least vehicle speed or wheel speed, yaw rate and steering angle, said vehicle motion control system comprising a Yaw Stability Control (YSC) functionality with an oversteer control functionality comprising the step of:

arranging the YSC functionality to be fail-operational by:

providing at least a first and a second YSC system, such that when one is shut down, the other will still be working, for controlling the vehicle path by controlling a yaw and/or lateral vehicle state, said at least first and second YSC systems being independent with each a controller with an oversteer control function, and each connected to one or more sensor arrangements comprising a number of sensors, said at least two YSC systems further comprising at least two of one or more YSC system(s) which is/are arranged to act on the/a steering system of the vehicle by acting on one or more steering system actuators comprising steering system gear or position actuators, an YSC system, which is arranged to act on the/a braking system of the vehicle by acting on one or more brake system actuators;

an YSC system, which is arranged to act on the/a torque vectoring system of the vehicle by acting on one or more torque vectoring system actuators, in any combination;

determination from input signals from the sensor arrangement(s) of a measure of a torque applied by a driver via a steering wheel;

transformation of the above-mentioned input signal of a measure of a torque applied by the driver via a steering wheel to a target yaw and/or lateral vehicle state, providing the target yaw and/or lateral vehicle state as input signals to one or more YSC controller(s); and minimizing control error(s) between the target yaw and/or lateral vehicle state and a corresponding measured actual yaw and or lateral vehicle state in the YSC controller(s) controlling said one or more yaw and/or lateral vehicle state actuators for the vehicle state control using a said minimized control error(s).

23. The method for vehicle motion control according to claim 22, comprising the step of providing a fail-operational YSC-functionality by providing at least a first and a second fail-safe YSC system.

24. The method for vehicle motion control according to claim 22, comprising the step of providing a fail-operational YSC-functionality by providing one or more fail-operational vehicle systems or a combination of fail-safe and fail-operational subsystems or sub-functions.

25. The system for vehicle motion control according to claim 11, further comprising including provisioning of a warning or an indication to a driver of the vehicle.

* * * * *